June 23, 1925.

H. M. GRANT

VEHICLE FUEL TANK FILLER CAP LOCK

Filed March 14, 1922

1,543,256

INVENTOR.
HERBERT M. GRANT.
BY A. B. Bowman
ATTORNEY.

Patented June 23, 1925.

1,543,256

UNITED STATES PATENT OFFICE.

HERBERT M. GRANT, OF SAN DIEGO, CALIFORNIA.

VEHICLE FUEL-TANK FILLER-CAP LOCK.

Application filed March 14, 1922. Serial No. 543,621.

*To all whom it may concern:*

Be it known that HERBERT M. GRANT, a citizen of the United States, residing at San Diego, in the county of San Diego and State of California, has invented a certain new and useful Vehicle Fuel-Tank Filler-Cap Lock, of which the following is a specification.

My invention relates to vehicle fuel tank filler cap locks and more particularly to a device adapted to lock the cap to the fuel tank and the objects of my invention are: First, to provide a device of this class which will eliminate the losing or displacing of the cap or the leaving of the same at filling stations; Second, to provide a device of this class which will prevent the cap dropping on the ground and therefore prevent unnecessary and objectionable dirt getting into the fuel tank; Third, to provide a device of this class which will neither interfere with the ready removing of the cap from the opening of the tank nor the filling of said tank; Fourth, to provide a device of this class which will necessitate laying or hanging the cap in close proximity to the opening of the tank; Fifth, to provide a device of this class which is novelly constructed, and Sixth, to provide a device of this class which is very simple and economical of construction, durable, adaptable to all vehicle fuel tanks, and which will not readily deteriorate or get out of order.

Figure 1:
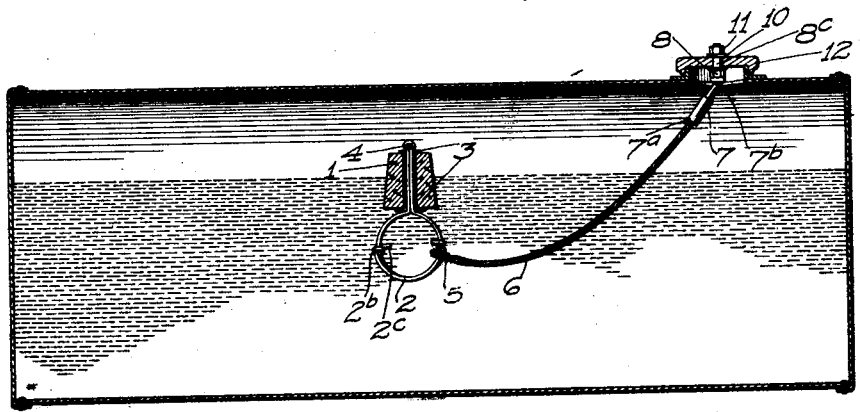
Figure 2:
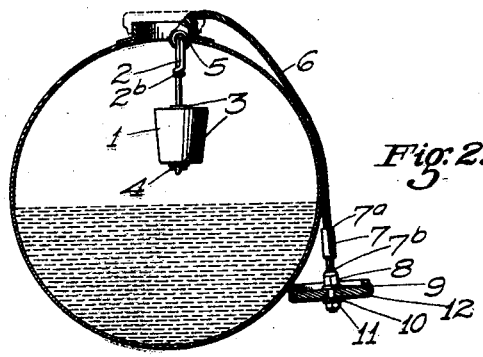
Figure 3:
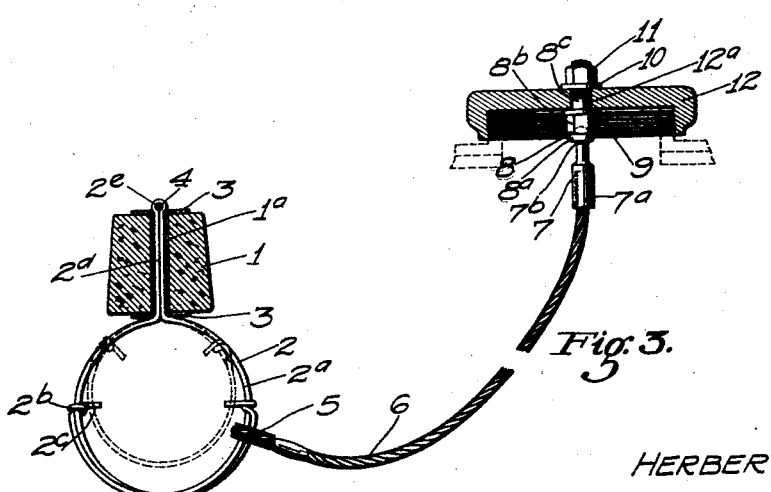

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional elevational view through the middle of a gasoline tank showing my device suspended therein and secured to the cap; Fig. 2 is another sectional elevational view of a gas tank taken at a right angle to that of Fig. 1 showing the cap removed therefrom and suspended on the side thereof; Fig. 3 is an enlarged view of my device partly in section to facilitate the illustration and secured to a conventional fuel tank filler cap.

Like characters of reference refer to similar parts and portions throughout the several views of the drawings.

The float member 1, collapsible ring 2, washers 3, cotter pin 4, ring 5, cable 6, ball member 7, socket and bolt member 8, washers 9 and 10, nut 11 and a cap 12 constitute the principal parts and portions of my device.

The float member 1 is preferably made of some inexpensive light material which will not be acted on by the contents of the tank and is provided with a longitudinal hole $1^a$ therein. The collapsible ring 2 consists of a substantially circular shaped ring portion $2^a$ with loops $2^b$ at the free ends of the wire forming the ring adapted to be adjusted on the other portions of said ring portion for the purpose of increasing and reducing the size of said ring portion $2^a$. In forming the loop $2^b$ the wire forming the same is preferably left extending inwardly therefrom as shown by $2^c$, thus providing a stop for the upward motion of the ring 5. The collapsible ring is further provided with a projection $2^d$ extending outwardly from one side thereof and provided with an eye $2^e$ at the extreme end of said projection. The projection $2^d$ of said collapsible ring extends through the hole $1^a$ provided for that purpose in the float member 1 and secured in position thereto by the cotter pin 4 and inserted through the eye $2^e$ of said collapsible ring member. Washers 3 are interposed between said cotter pin and said float member at one end between the collapsible ring member 2 and the float member 1 at the other. A ring 5 is loosely inserted on the ring portion $2^a$ of said collapsible ring member so that it may be readily shifted thereon. A cable 6 is secured to said ring 5 at one end and to the socket portion $7^a$ of the ball member 7 at the other. Said ball member 7 is provided with a ball portion $7^b$ at the other end thereof adapted to fit into a socket $8^a$ of the bolt and socket member 8 forming a ball and socket joint with the latter. The bolt and socket member 8 is provided with a polygonal portion $8^b$ at the socket end thereof for holding the same so that the nut 11 may be readily screwed on to the portion $8^c$ of said bolt and socket member. The conventional fuel tank filler cap 12 is provided with a hole 12ᵃ at the central portion thereof adapted to receive said bolt portion 8ᶜ and be clamped thereto. A lock washer 9 is interposed between the head portion of said bolt and socket member and the inner surface of said cap. A gasket washer 10 is interposed between the nut 11 and the exterior face of the cap 12 to prevent the contents of the tank thereof escaping.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention what I claim as new and desire to secure by Letters Patent is:

1. In a device of the class described, the combination with a vehicle fuel tank of a filler cap, a flexible cable secured to said cap, a collapsible ring secured to the free end of said cable and a float secured to said collapsible ring.

2. In a vehicle fuel tank filler cap lock means, a vehicle fuel tank, a filler cap adapted to be mounted on the upper side of said tank, an extended member with one end secured to said filler cap, a reducible member secured to the free end of said extended member, and a float secured to said reducible member.

3. In a device of the class described, the combination with a vehicle fuel tank of a filler cap screwed thereon, a ball and socket joint means secured to the under part of said filler cap, a flexible cable secured to said ball and socket joint means, a collapsible ring secured to the free end of said flexible cable and a float secured to said collapsible ring.

4. In a device of the class described, the combination with a vehicle fuel tank of a filler cap adapted to be secured over the filler opening of said fuel tank and provided with a central hole therein, a bolt and socket member secured to the under side of said filler cap and extending through the hole provided therein, a ball member secured in the socket portion of said bolt and socket member, a flexible cable secured at its one end to said ball member a yieldable ring reciprocably mounted in the free end of said flexible cable and provided with an extended portion on one side thereof, a float provided with a hole therein adapted to receive and secure therein the extended portion of said yieldable ring.

In testimony whereof, I have hereunto set my hand at San Diego, California this 9th day of March, 1922.

HERBERT M. GRANT.